United States Patent [19]
LaFosse

[11] 3,809,521
[45] May 7, 1974

[54] APPARATUS FOR BLOW MOULDING

[75] Inventor: Claude LaFosse, Chalon Sur Saone, France

[73] Assignee: Saint-Gobain Carnaud Interplastic, Neuilly-Sur-Seine, France

[22] Filed: Mar. 6, 1973

[21] Appl. No.: 338,597

[30] Foreign Application Priority Data
Mar. 9, 1972  France .............................. 72.08177

[52] U.S. Cl. ....... 425/326 B, 264/99, 425/DIG. 206, 425/DIG. 213
[51] Int. Cl. ............................................ B29d 23/03
[58] Field of Search ... 425/326 B, 387 B, DIG. 203, 425/DIG. 206, DIG. 213; 264/99

[56] References Cited
UNITED STATES PATENTS
2,784,452   3/1957   Ruekberg et al. ............... 425/326 B

*Primary Examiner*—Richard B. Lazarus
*Attorney, Agent, or Firm*—Karl W. Flocks

[57] ABSTRACT

Apparatus for blow moulding of plastics materials has a duct rotatable about a fixed extrusion head to deposit an extruded tube in a series of fixed moulds arranged in a ring. The duct may be supplied with a cooling fluid to adjust the temperature of the tube. Simple operation and high production speeds can be achieved.

9 Claims, 4 Drawing Figures

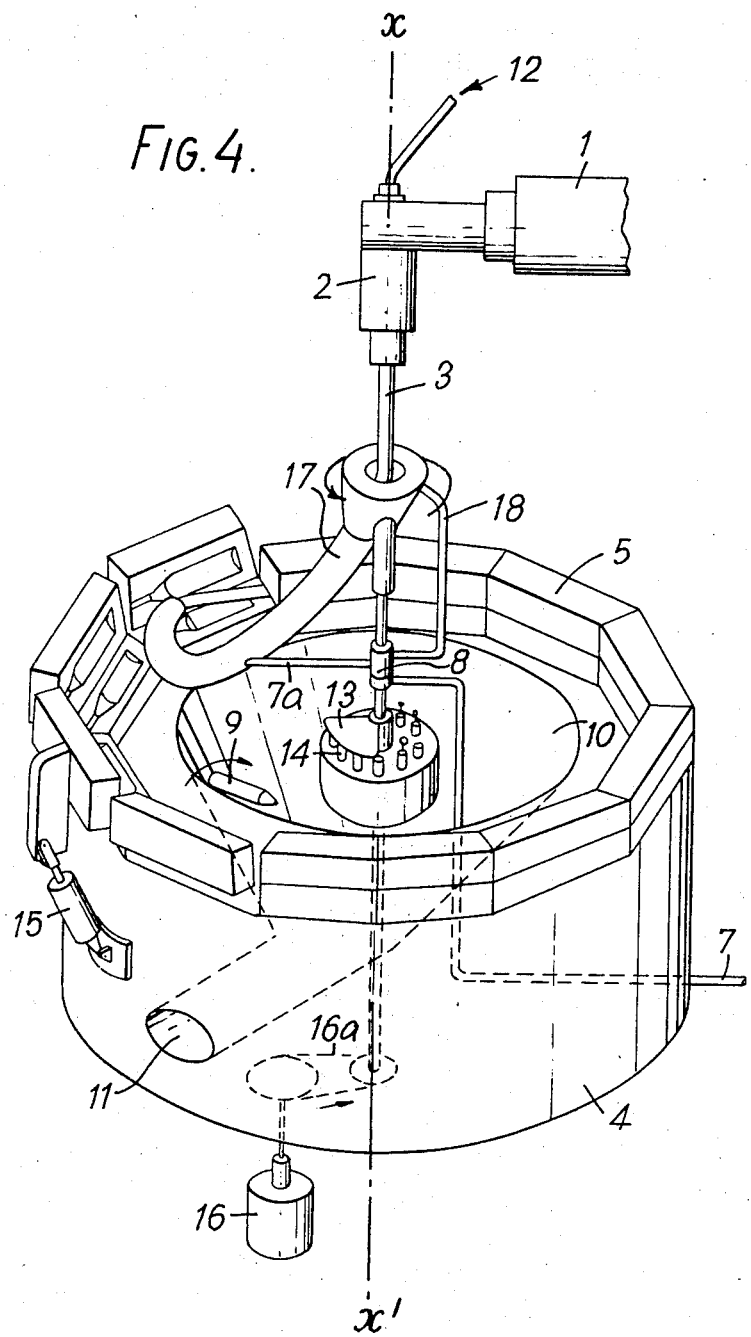

APPARATUS FOR BLOW MOULDING

BACKGROUND OF THE INVENTION

The present invention relates to apparatus for blow moulding, especially for the continuous production of hollow objects of thermoplastic materials by blow moulding of an extruded tube at a temperature such that its viscosity state permits it to be blown.

Hitherto known extrusion-blowing machines comprise mechanisms for carrying out and coordinating extrusion and blowing processes, operating discontinuously or continuously. The use of discontinuous mechanisms generally imposes a very definite limit on the production rate which may be achieved and usually entails the use of very complicated devices. Continuous mechanisms make it possible to increase the production speed, which can achieve high values in the case of machines having continuously rotating components. Nevertheless, such machines are subject to mechanical problems arising from the inertia of the masses in motion, notably when the machine is started and stopped. In addition, it becomes difficult to remove from the machine the hollow objects produced which, due to their generally low weight, are difficult to handle at high speeds.

The bi-orientation phenomenon, the advantages of which are very well known today in the manufacture of blown hollow objects, cannot be achieved in extrusion-blowing machines of conventional type without making use of complicated mechanical devices which generally impose limitations on the production rates which can be achieved.

An object of the present invention is to provide relatively simple apparatus whereby articles may be produced by extrusion and blow-moulding at high speed under conditions which permit bi-orientation of the extruded material.

Another object is to provide blow-moulding apparatus capable of producing blow-moulded articles continuously at high speed using fixed moulds.

These and other objects of the invention will be apparent from the following description.

SUMMARY OF THE INVENTION

According to one aspect of the invention, there is provided apparatus for producing hollow articles by blow moulding which comprises an extrusion head for delivering a continuous tube of plastics material, a plurality of fixed two-part moulds arranged as a ring concentric with the central axis of extrusion of the head, a duct having two ends, one end positioned in the vicinity of the head to receive the tube extended from the head and the other end positioned to deposit the tube in the moulds, means for rotating the duct about said axis to allow said other end to deposit the tube in the successive moulds around the ring, means for opening and closing of the moulds with the rotation of the duct so that said other end deposits the tube in an open mould which closes when said other end is positioned to deposit the tube in the next succeeding mould in the direction of rotation of the duct around the ring.

The duct which guides the extruded material from the extrusion head to the moulds may be in the form of a tube or in the form of an open trough.

In a preferred embodiment of the invention, means are provided for supplying a cooling fluid such as air to the duct to allow precise adjustment to a desired value of the temperature of the extruded tube at the instant in which it is deposited in a mould.

According to an advantageous embodiment the fluid introduced into the duct contributes to the supporting of the extruded tube by forming a gas cushion which prevents contact of the tube with the walls of the duct over at least a portion of its length.

As a result of the precise temperature control of the extruded tube during its passage through the duct, notably in the case in which the fluid forms a gas cushion, very good mechanical properties can be imparted to the hollow objects obtained.

Other characteristics and advantages of the apparatus according to the invention will become apparent from the description below which relates to two embodiments of the apparatus, given by way of non-restrictive examples.

DESCRIPTION OF PARTICULAR EMBODIMENTS

Reference is made to the accompanying drawings in which:

FIG. 4 is a perspective view of apparatus according to another embodiment of the invention with a tubular duct.

Figure 1:
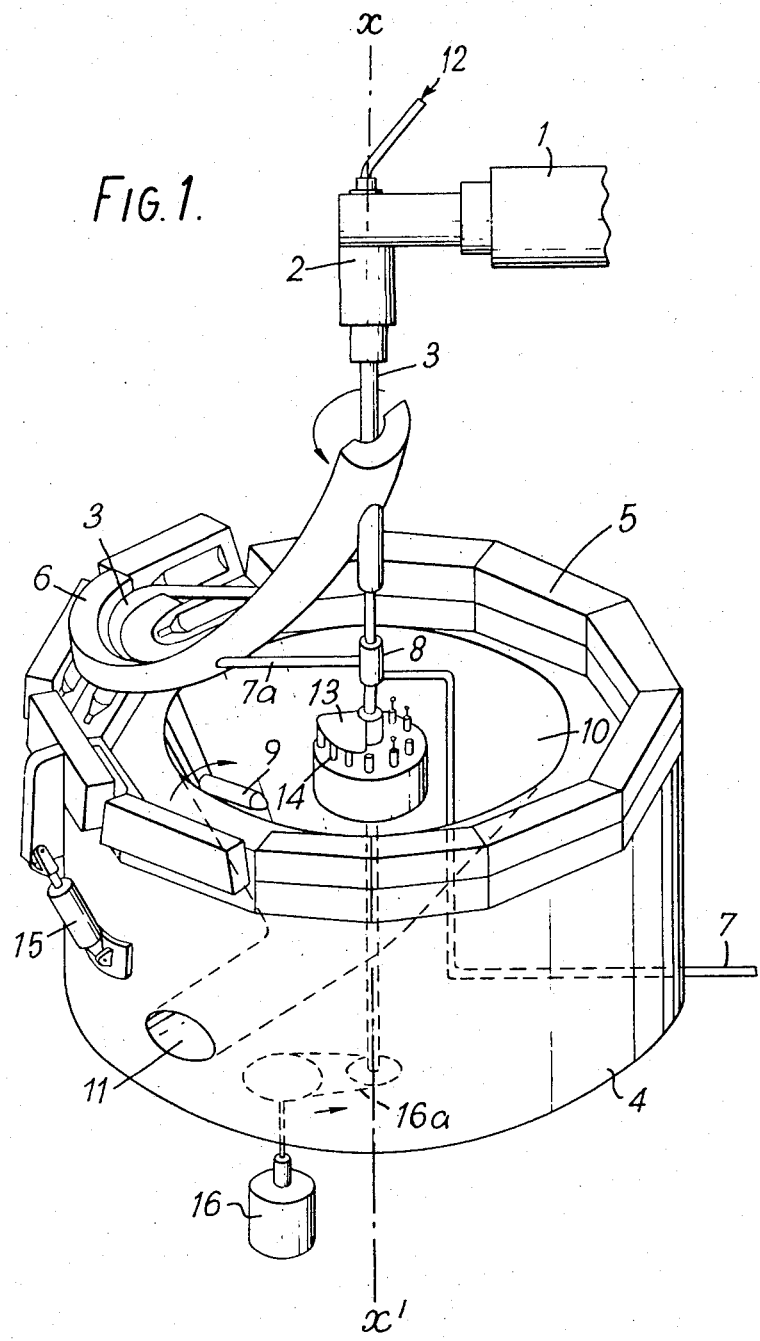
FIG. 1 is a perspective view of apparatus according to one embodiment of the invention in which the duct is in the form of a trough.

As shown in FIG. 1, the apparatus of one embodiment comprises a fixed extrusion device 1 of conventional type, producing by means of a vertical-axis head 2 a tube or parison 3, under conditions of temperature and homogenisation which allow blowing of a thermoplastic material supplied to the device 1 or under conditions close to these. A duct 12 is connected to a supply of air under pressure (not shown) to supply air to the interior of the extruded tube.

The apparatus also comprises, mounted on a horizontal fixed support 4, contiguous moulds 5 arranged as a ring concentric with the axis XX' of the extrusion head 2. The lower parts of these moulds are fixed to the support 4 and their upper parts are capable of an opening and closing movement relative to the respective lower parts. This movement is produced by means of hinges, as shown in the drawings. It may also be produced by other known devices such as slides.

A duct 6, in the form of a trough, rotationally moveable about the axis XX', is arranged to collect at its inlet end the extruded parison 3 and provides a guide for tube 3 from the extrusion head 2 to the moulds 5 and also ensures its distribution in the moulds. A continuous circular motion is imparted to this trough by a motor 16 through the intermediary of a simple transmission gear 16a.

The closing and opening of the moulds is synchronised with the rotation of the shute by valves 14 which are arranged concentrically to the axis XX' and actuated by a cam 13 connected to the trough, these valves being arranged to control the distribution of a pressurised fluid into rams 15 each connected to the upper part of one mould.

The trough may be constructed from any material possessing good hot friction properties with respect to the extruded material and possessing surface properties which facilitate sliding of the extruded tube. The material used for making the trough may, for example be a super-polyamide, polytetrafluroethylene or polished steel.

In order to assist the sliding of the extruded parison 3 along the shute, mechanical devices such as roller bearings, ballbearings and endless belts (not shown) may also be provided.

In order to control the temperature of the extruded tube before moulding, provision is made for introducing into the trough a cooling fluid such as air. The cooling fluid may be introduced through a duct 7, a rotating seal 8 and a duct 7a. It is evacuated through orifices along the internal face of duct 6 as to form an air cushion which extends throughout the length of the trough. This air cushion prevents contact of the extruded parison with the solid wall of the trough.

After moulding, the hollow objects produced such as bottles 9 are ejected from the mould into a central recovery hopper 10 and are removed from the machine through the opening 11.

The apparatus of FIG. 1 functions in the following manner:

continuous extrusion of a tube or parison 3 from the fixed head 2. The interior of the parison effectively constitutes a sealed chamber within which there is maintained a controlled air pressure, by means of air supplied through duct 12.

guiding of the parison 3 through the trough 6, the trough being continuously rotated about the axis XX'.

during this rotation, continuous deposition of the parison into the fixed moulds 5 which open and close again in succession before and after the passage of the duct.

blowing of the parison to obtain the desired article, by needle piercing or any other method, and cooling of the article obtained in each mould during the rotation of the duct around the other moulds.

opening of the moulds and ejection of the hollow articles formed immediately before the passing of the trough.

After being ejected from the moulds and discharged through the opening 11 of the machine, the hollow objects may be conveyed to a cutting device (not shown) for example for trimming the necks in the case of bottles.

Figure 2:
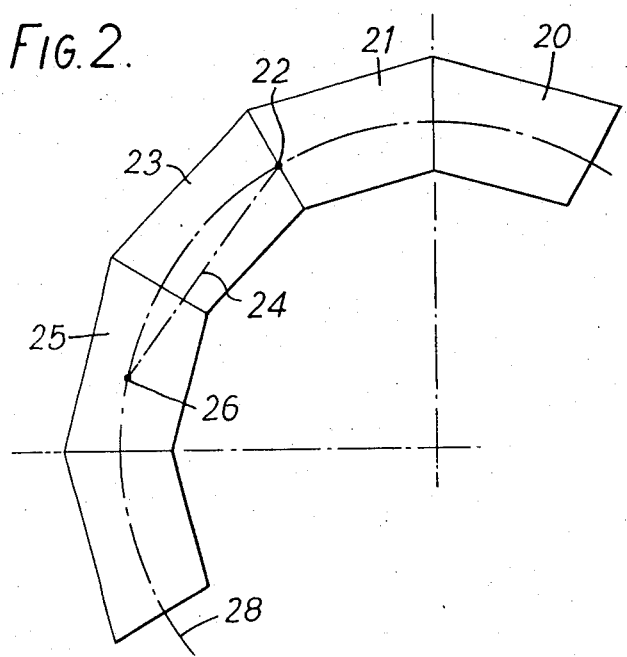
FIG. 2 is a diagrammatic partial view showing the moulds disposed as a ring in the apparatus of FIG. 1.
Figure 3:
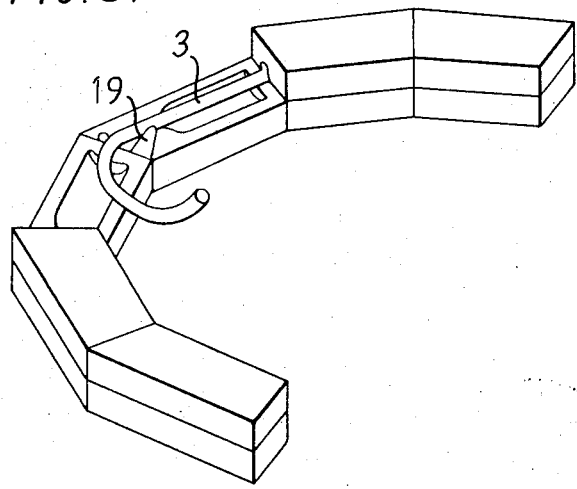
FIG. 3 is a diagrammatic perspective view showing the guiding of the extruded tube into a mould in the apparatus of FIG. 1.

As shown in FIG. 3, it is convenient to provide each mould, at its front or rear portion, with a guide member 19, the object of which is to maintain the axis of the parison coincident with the longitudinal axis of the mould in which it has just been laid. In effect, the deposition of the parison is effected over a free length greater than that of a mould as indicated diagrammatically in FIG. 2. Under these conditions, the parison becomes stretched between the rear 22 of the last closed mould 21 and the end 26 of the duct, this occurring immediately before the closure of the succeeding mould 23. The parison would therefore adopt an alignment 24 constituting a chord to the circumference 28 along which the moulds are aligned, if said parison were not maintained in a correct position by appropriate guiding between each mould. The guide members may comprise thin fingers or lugs.

The embodiment shown in FIG. 4 is analogous to that shown in FIG. 1, in which like numerals indicate like parts. The embodiments differ in that the duct of FIG. 4 is constituted by a tube 17. Into this tube there may be introduced a fluid to control the temperature of the parison and also, for forming an air cushion. This fluid may be introduced into the tube in the same manner as in FIG. 1, and also to the upper part of the tube via a duct 18.

It may be seen that, in the apparatus described, the large masses which are usually in motion in known extrusion-blowing are stationary. The duct and the extruded tube, which are of relatively small mass, are the only major components in motion, which permits a very high production rate to be achieved.

Operation of the apparatus is made easy by the small number of parts in motion, the easy access to all the fixed components and the complete separation of the extrusion head from the rest of the apparatus. The extrusion head may thus be equipped, without difficulty, with all the control devices or other equipment required for controlling the extrusion conditions at optimum values.

The use of a distributing duct as described above allows control of the temperature of the parison by a controlled cooling of the air fed to the duct. This temperature control makes it possible to achieve bi-orientation of the extruded material at the instant when it is blown in the mould.

In addition, the use of such a supply of cooling fluid to the duct makes it possible to achieve a homogeneous and continuous distribution of the cooling effect over the whole surface of the parison. This effect results from the twisting or rotation of the parison about its axis due to the fact that the parison is unrolled around a fixed circle 28, along which the moulds are aligned, starting from a fixed point situated on the axis of the extrusion head.

Further, the duct permits a certain tension to be maintained in the parison and also makes it possible to deposit in the moulds tube portions of varying thickness. The thickness of the tube may be intentionally varied by any suitable device associated with the extrusion head for this purpose.

Quite apart from making it possible to achieve an increase in production rate, the apparatus according to the invention also affords the possibility of utilising, while still retaining the same advantages, the technique of blow moulding in rough moulds followed by moulding in finishing moulds; the advantages of this method are well known. This facility is particularly useful when it is desired to utilise the bi-orientation phenomenon.

Apart from the advantages indicated above, it should be mentioned that the fixed arrangement of the moulds makes it possible to use any known process for inserting into the moulds pieces of material of a different colour or composition from those of the extruded material, or of any support for imprinting texts or designs on the surface of the articles obtained. Such processes are in current use with single mould machines or machines with a limited number of moulds but have not hitherto been suitable for use with machines having a high production rate, i.e., capable of producing articles in very large numbers. The apparatus according to the invention makes it possible to place inserts into the moulds easily, even though the time available for this operation is very short, because the moulds are fixed.

The apparatus according to the invention may include mechanical extraction devices for the hollow articles produced, thus permitting a positive and orderly transfer of said articles to a succeeding production line.

It should be understood that the invention is applicable to the production by blowing of hollow articles of any thermoplastic material, that is to say any material which possesses characteristics of thermoplasticity allowing blow moulding. Such materials include well-known organic thermoplastic resins.

I claim:

1. Apparatus for producing hollow articles by blow moulding which comprises an extrusion head for delivering a continuous tube of plastics material, a plurality of two-part moulds arranged in a ring concentric with the central axis of extrusion of the head, means for opening and closing the moulds, a duct having two ends, one end positioned in the vicinity of the head to receive the tube extruded from the head and the other end positioned adjacent the moulds, means for rotating the duct about said axis to allow said other end to deposit the tube in successive moulds around the ring, and means for synchronising the opening and closing of the moulds with the rotation of the duct so that said other end deposits the tube in an open mould which closes when said other end is positioned to deposit the tube in the next succeeding mould in the direction of rotation of the duct around the ring.

2. Apparatus according to claim 1, having fluid supply means for supplying a cooling fluid to the duct.

3. Apparatus according to claim 2, in which the fluid supply means is such that the cooling fluid forms a gas cushion which prevents contact of the extruded tube with the interior of the duct over at least a portion thereof.

4. Apparatus according to claim 1, in which the duct is a tube.

5. Apparatus according to claim 1, in which the duct is a trough.

6. Apparatus according to claim 1, in which the moulds are provided with respective guiding members capable of maintaining the longituidnal axis of the extruded tube coincident with a longitudinal axis of the mould when the tube is deposited in the mould.

7. Apparatus according to claim 1, in which the moulds comprise upper and lower parts and the upper parts of the moulds are hinge-mounted upon the lower parts.

8. Apparatus according to claim 1, having rams connected to the moulds to open and close the moulds and actuating means for actuating the rams, the actuating means including a cam connected to the duct for rotation therewith.

9. Apparatus according to claim 1, having a hopper, means for ejecting the moulded articles from the moulds into the hopper and means for discharging the moulded articles from the hopper.

* * * * *